United States Patent [19]

Peairs et al.

[11] Patent Number: 5,867,597
[45] Date of Patent: Feb. 2, 1999

[54] HIGH-SPEED RETRIEVAL BY EXAMPLE

[75] Inventors: Mark Peairs, Menlo Park, Calif.; Jonathan Hull, Amherst, N.Y.

[73] Assignee: Ricoh Corporation, Tokyo, Japan

[21] Appl. No.: 523,731

[22] Filed: Sep. 5, 1995

[51] Int. Cl.⁶ ............................ G06K 9/62
[52] U.S. Cl. .................. 382/209; 382/224; 382/229; 395/606; 395/605
[58] Field of Search .................. 382/170, 175, 382/224, 225, 228, 229, 209; 395/605, 606, 794

[56] References Cited

U.S. PATENT DOCUMENTS

| | | | |
|---|---|---|---|
| 4,949,392 | 8/1990 | Barski | 382/317 |
| 5,384,864 | 1/1995 | Spitz | 382/173 |
| 5,465,353 | 11/1995 | Hull et al. | 395/605 |

FOREIGN PATENT DOCUMENTS 0 544 434 A2  6/1993  European Pat. Off. ......... G06K 9/00

*Primary Examiner*—Jose L. Couso
*Assistant Examiner*—Anh Hong Do
*Attorney, Agent, or Firm*—Philip H. Albert; Townsend and Townsend and Crew

[57] ABSTRACT

An improved document management system with high-speed retrieval by example retrieves a document attaching a target document, in whole or part, by comparing descriptors of documents. A descriptor is derived from a pattern of labels, where each label is associated with a character, or more precisely, a character bounding box. A bounding box is found by examining contiguous pixels in an image. The particular label associated with a bounding box depends on the value of a metric measured from that bounding box. In one system, the metric is the spacing between the bounding box and an adjacent bounding box, in which the labels approximately reflect a pattern of word lengths. In other systems, where words lengths are not present, the metric might be pixel density and the pattern of labels approximately reflect a pattern of denser characters and sparser characters. The document management system, or just the query portion of the document management system could be part of a copier, where a sample page is input to the copier and the copier retrieves the matching document and prints it.

17 Claims, 15 Drawing Sheets

174

112

5.2. Numerical Simulation of Well Tests

Numerical simulations of well tests in two dimentional fracture systems have been conducted using the numerical model discussed above. First, systems with two orthogonal sets of continuous fractures with constant spacing were investigated. Snow (1960) showed that such a system behaves like a porous medium under regional flow but he did not consider well test conditions in his study. Since the pressure gradient along a fracture is not constant or even uniform under well test conditions, it is not obvious that such a system always behaves like a porous medium. Next, well tests were performed in discontionuous fracture systems with distributed lengths and orientations. Such systems should be closer representations of actual fracture systems. The study is limited to two-dimensional systems but should provide useful insight especially where vertical fractures are dominant.

5.2.1. Well Tests in Continuous Fracture Systems

Figure 5.5a shows the fracture mesh used in Case-1. The fractures have a constant spacing of $1m$ and a constant aperture of $5 \mu m$. The storage coefficient of a fracture is set to $1.0 \times 10^{-4}$ $1/m$, which essentially assumes the fracture is rigid. The theoretical value of the permeability of this system as predicted by Snow's technique, is $1.02 \times 10^{-10}$ $m/s$. The storage coefficient is $1.00 \times 10^{-10}$ $1/m$, which can be obtained by volumetrically averaging the value for the fracture over a unit volume of rock. The pumping well is located at the center and the pressure transient is monitored at observation wells

FIG. 4(a)

Numerical simulations of v have been conducted using the tems with two orthogonal sets were investigated. Snow (1965 porous medium under regional tions in his study. Since the slant or even uniform under wa

HIGH-SPEED RETRIEVAL BY EXAMPLE

BACKGROUND OF THE INVENTION

The present invention relates to the field of electronic document management, more specifically to document management systems where a target document is retrieved using an example of content of the target document.

U.S. Pat. No. 5,464,353, issued to Jonathan Hull, et al. (application Ser. No. 08/222,281 filed Apr. 1, 1994 and currently pending) entitled "Image Matching and Retrieval by Multi-Access Redundant Hashing" (incorporated by reference herein and referred to as "Hull") disclosed a new method for retrieving a document from a document management system where the input to the system is a sample page from the target document. In that system, descriptors are extracted from each document being stored and those descriptors are stored in a descriptor database. To retrieve a target document, only a sample page or portion of a page is needed. The sample page is presented to the document management system, descriptors are extracted from the sample page and then they are matched to descriptors in the descriptor database. Since many descriptors are taken from each stored document and from the sample page, they are redundant. As explained by Hull, where many descriptors might match between the target document and the sample page, but errors are not fatal to the search. In that system, documents accumulate votes based on matches of descriptors and the document with the highest vote count is returned as the target document.

Of the descriptors disclosed by Hull, graphical descriptors looked to key features of the graphics on a page, whereas text descriptors looked to the pattern of letters or word lengths. However, the document management system of Hull uses an optical character recognition system to recognize characters from a digitized image of a page of a document or a sample page in order to form the descriptors for the page image. Since this is a computationally expensive operation, a more efficient method for generating descriptors from text is needed.

SUMMARY OF THE INVENTION

An improved document management system with high-speed retrieval by example is provided by virtue of the present invention. In one embodiment, the pages of documents scanned to be included in the storage of the document management system and the sample pages scanned as part of a retrieval process are described by descriptors that are extractable from the page with little computational effort. In a particular embodiment, bounding boxes are formed around connected components and the interbox spacings are measured. A histogram of interbox spacings is found and a threshold value is determined, with spacings less than the threshold deemed to be intercharacter spacing and the spacings larger than the threshold deemed to be interword spacings. The pattern of spacings is then translated into descriptors. In another embodiment, where interword spacing is rare, such as with Japanese text or other text which uses two alphabets with different densities, the histogram is of the pixel density of the bounding boxes instead of the interbox spacing.

To address breaks in characters, overlapping bounding boxes may be combined into a single bounding box. If necessary, a language detection preprocessor could be used to detect the language of a document and apply the appropriate descriptor extraction. In a document where character spacing is regular, the intercharacter spacing can be used to further define the bounding boxes.

The document management system, or just the query portion of the document management system might be tied into a copier. In such an embodiment, a user would need only to submit the sample page to the copier and the copier would retrieve the target document and print it.

In alternate embodiments, the speech and text documents are used interchangeably as reference documents and large documents. The descriptors for a speech document can be either the pattern of phonemes per word or letters per word. In the former, a phoneme identifier is used and the phoneme identifier can identify interword silences. In the latter, a speech recognizer is used and the speech is converted to text which is then used as the basis for descriptor generation.

A further understanding of the nature and advantages of the inventions herein may be realized by reference to the remaining portions of the specification and the attached drawings.

BRIEF DESCRIPTION OF THE DRAWINGS

FIG. 4($a$) is an illustration of a document image.

FIG. 4($b$) is a closer view of a portion of the text area show in FIG. 4(A).

FIG. 6 is a image of a document containing Japanese characters.

FIG. 7($b$) is an image of the Japanese character shown in FIG. 7($a$) with bounding boxes generated for portions of the Japanese character.

FIG. 7($c$) is an image of the Japanese character shown in FIGS. 7($a$) and 7($b$) with a single bounding box enclosing substantially all the character.

DESCRIPTION OF THE PREFERRED EMBODIMENTS

The figures first show two embodiments with some elements in common. In one embodiment, intercharacter spacing is used to distinguish one document from another. The second embodiment uses character density to distinguish documents, followed by alternative embodiments where reference documents and/or target documents are in speech and/or text form.

In general, these two systems work the same way and might even be used together. Before a document can be retrieved from a document database, the document database must be generated. To generate the database, documents are input. If the documents exist only on paper form, they are scanned to produce electronic, digitized representations of the documents. If the documents already exist in electronic form, the scanning step is not needed. For each document, a set of descriptors are generated. A descriptor is a pattern of metrics for part of the document. For example, if the metric is character spacing and the metric has one of two values (for example 1="interword space" and 0="intraword space"), a bit pattern can be generated for some or all of the document. Alternatively, the bit pattern is compressed into a string of word lengths. The bit pattern or word length pattern is then used as the descriptor.

Typically, many descriptors are taken from a document and the descriptors may contain errors. However, if enough descriptors are taken, the errors will be filtered out, as explained in Hull. These descriptors are stored in an index and the document is stored in the document database.

To retrieve a document by example, all or part of a target document is input to the system. The matching document is the document in the document database which has the most descriptors in common with the target document. Of course, the requirements for matching documents could be relaxed so that multiple matching documents are found, not just the most promising candidate. These multiple matching documents might then be presented to the user for manual selection of the correct document.

The descriptors for the target document are obtained the same way the descriptors for the documents in the document database are obtained. Because the target document descriptors are obtained in the same way, the process of determining character bounds does not need to be correct, just consistent. The same is true for the process of measuring the metric. Thus, it is expected that some intraword spacings will be labelled as interword spacings, but since the same labelling occurs in the document database as with the target document, descriptors will match even though the labelling is not an accurate labelling of interword spacing.

Figure 1:
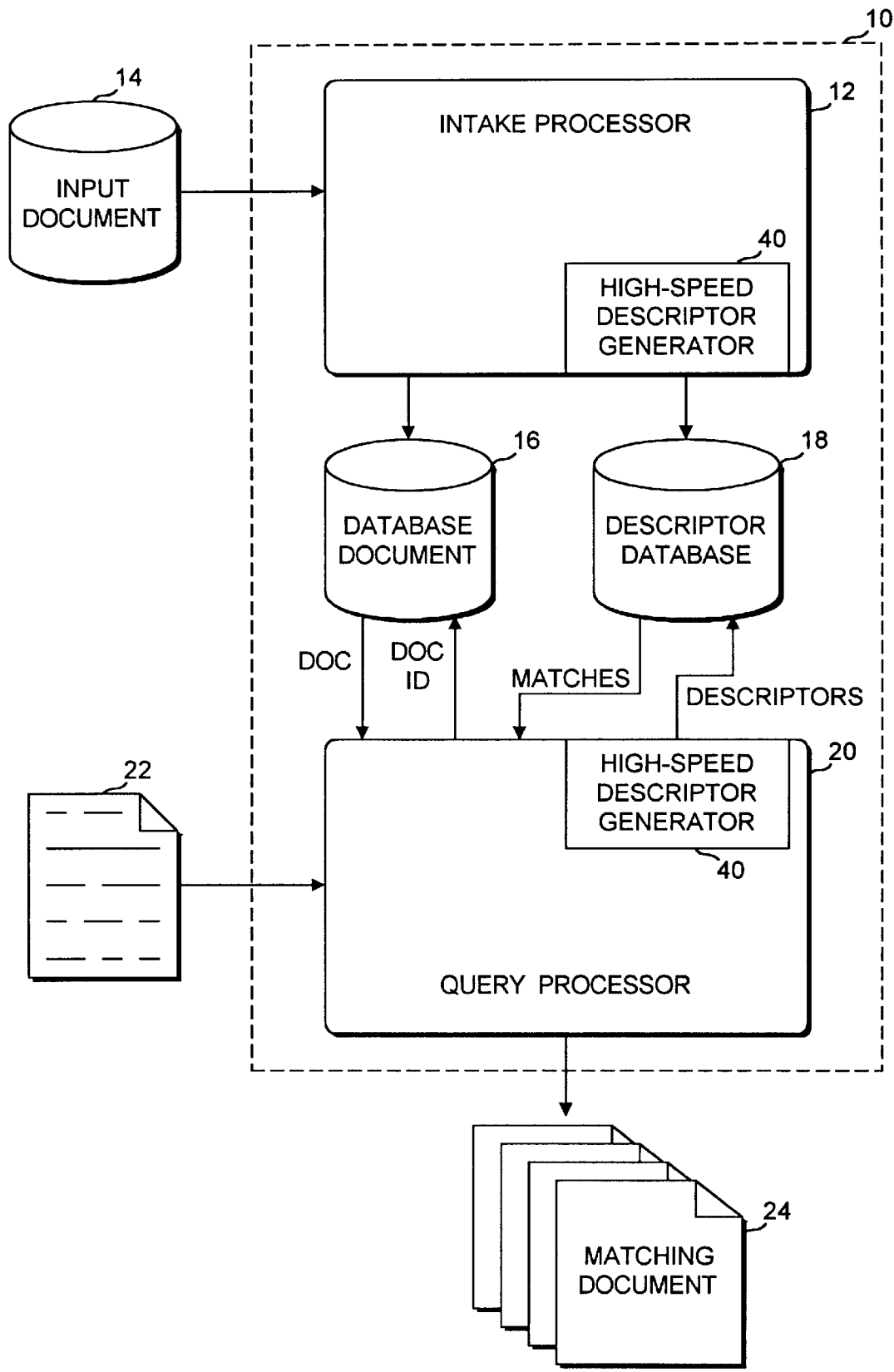
FIG. 1 is a block diagram of a document management system according to the present invention.

FIG. 1 is a block diagram of a document retrieval system 10, which includes an intake processor 12 for an input document 14, a document database 16, a descriptor database 18, a query processor 20 for processing a sample page 22 of a target document and for outputting the target document 24 which "matches" sample page 22. Both intake processor 12 and query processor 20 include a high-speed descriptor generator 40. Intake processor 12 accepts input documents, such as input document 14, and stores them into document database 16 while generating descriptors for the input document and storing the descriptors in descriptor database 18.

Query processor 20 accepts sample page 22 and generates descriptors for the sample page using its descriptor generator 40. Of course, in some embodiments, only one descriptor generator is used and is shared between intake processor 12 and query processor 20. Query processor 20 is coupled to descriptor database 18 in order to apply descriptors to descriptor database 18 and have returned to it matches identifying documents in document database 16 which have descriptors in common with sample page 22. Query processor 20 is also coupled to document database 16 in order to retrieve documents based on the document identifiers obtained from the description database.

Query processor 20 has an output from which a matching document (target document 24) is presented. In some embodiments, the output takes the form of a copier output which prints the target document. Query processor 20 might also include an interactive apparatus to allow a user to select from among more than one closely matching document (candidate documents).

Figure 2:
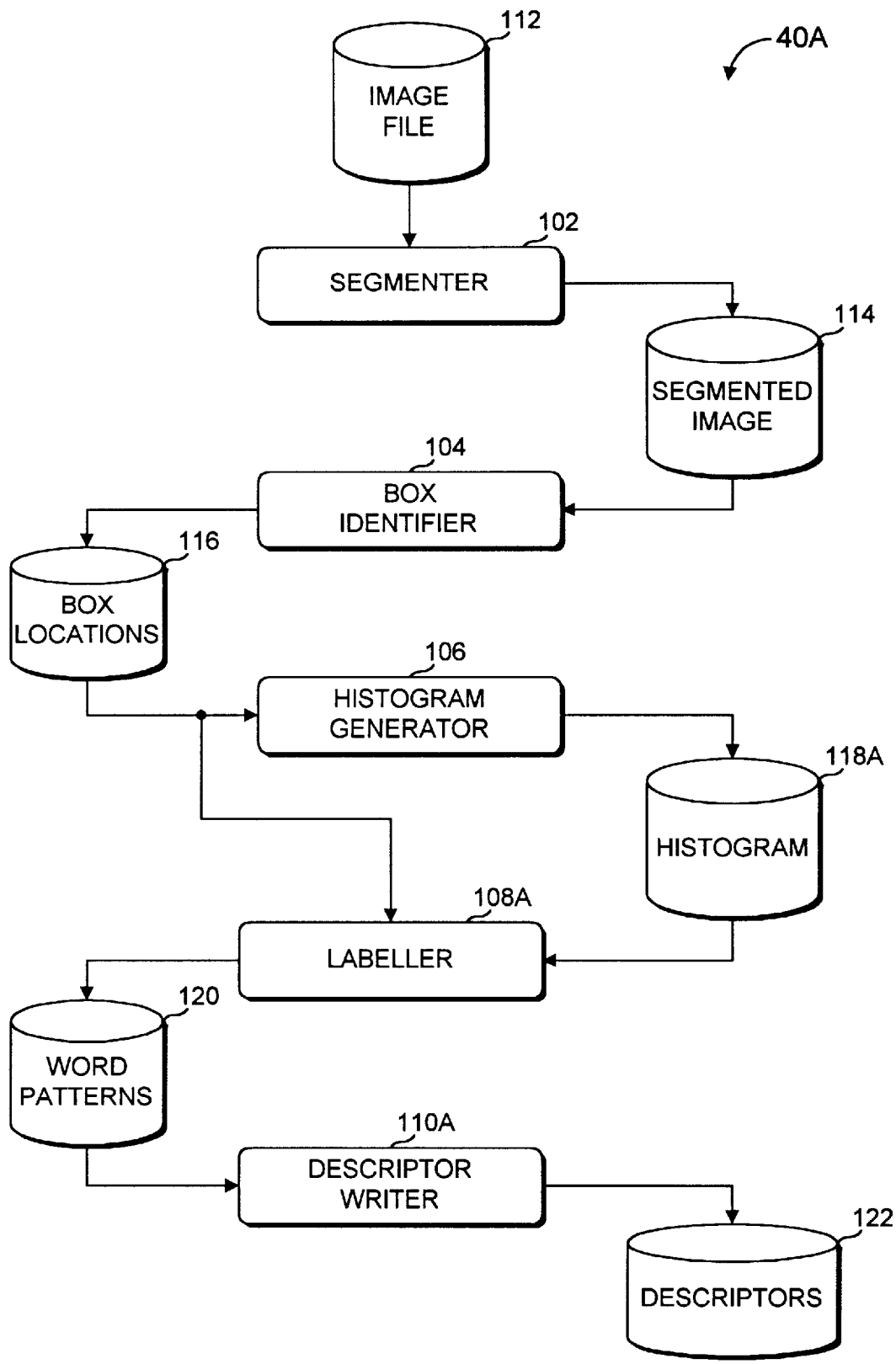
FIG. 2 is a block diagram of a descriptor generator which generates descriptors based on patterns of error character spacing.
Figure 3:
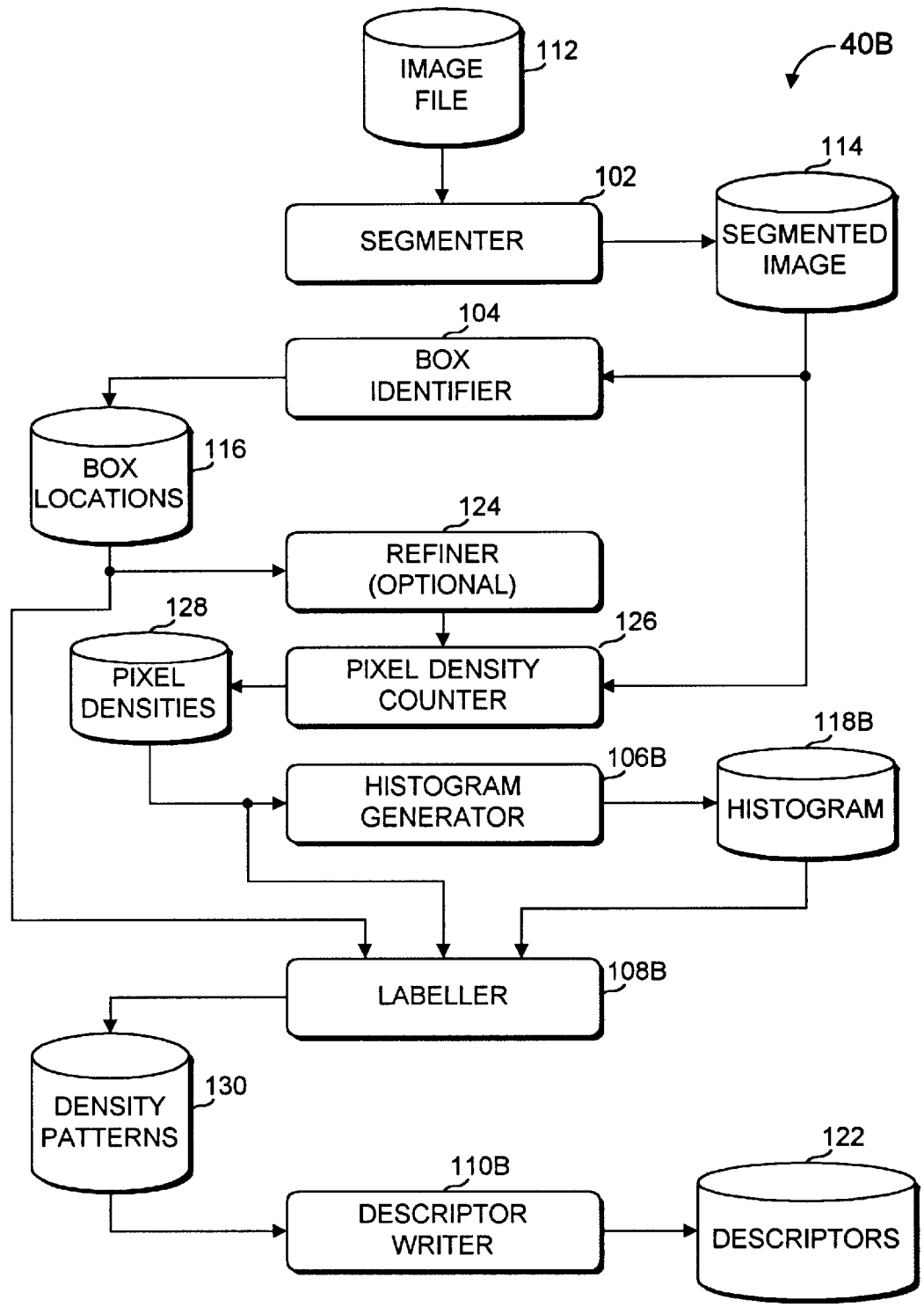
FIG. 3 is a block diagram of a descriptor generator which generates descriptors based on pixel density.

FIGS. 2 and 3 show descriptor generators in further detail. FIG. 2 is a block diagram of a descriptor generator 40A which generates descriptors based on word spacing (or approximations thereto). FIG. 3 is a block diagram of a descriptor generator 40B which generates descriptors based on pixel density.

Referring to FIG. 2, descriptor generator 40A is shown comprising a segmenter 102, a box identifier 104, a histogram generator 106, a labeller 108A, and a descriptor writer 110A. Segmenter 102 inputs an image file 112 and outputs a segmented image 114. Box identifier 104 inputs this segmented image 114 and outputs box locations 116. Histogram generator 106 inputs these box locations 116 and outputs a histogram 118A of interbox spacing. Labeller 108A uses box locations 116 and histogram 118A as inputs to generate a set of word patterns 120, which is input to descriptor writer 110A, which outputs a set of descriptors 122 for image file 112.

Image file 112 of FIG. 2 corresponds in FIG. 1 to an image of input document 14 or sample page 22. Segmenter 102 analyzes image file 112 and determines which areas of the image are text, figures, line art, or blank space. This allows down-stream elements of descriptor generator 40 to limit their work to the text areas of input image 112. Of course, as shown by Hull, the graphical areas of the image might also be used to generate descriptors. The text areas of image file 112 are stored as segmented image 114. Of course, depending on storage requirements and limitations, segmented image 114 could be limited to the text areas of image file 112, or segmented image 114 could be represented by nothing more than pointers to locations in the storage for image file 112.

However the text areas are stored, box identifier 104 processes those text areas to locate bounding boxes around characters. FIG. 4(a) shows one such text area and FIG. 4(b) shows a subset of that text area (enlarged) with bounding boxes drawn around characters. There the bounding boxes are rectangles which surround regions of continuous black pixels. Only regions which are above a threshold size are considered; note that the dots of the "i" characters (402) and the periods (406) are ignored. Since these discrepancies between the bounding box and the actual bounds of the character are discrepancies in both input documents and target documents, they do not result in any errors. Breaks in characters due to poor copying might cause the character bounding boxes to exclude portions of boxes, such as with bounding boxes 408. While these discrepancies might cause errors, given the number of descriptors taken the target document and the matching document should still have more descriptors in common than the target document and a nonmatching document.

In some embodiments, box identifier 104 performs an additional test on bounding boxes 116 to ensure that they are more or less lined up horizontally. This might be done by identifying the lines of text within the text areas, then identifying a baseline for each line of text and using the baseline as a guide for the location of bounding boxes.

Figure 5:
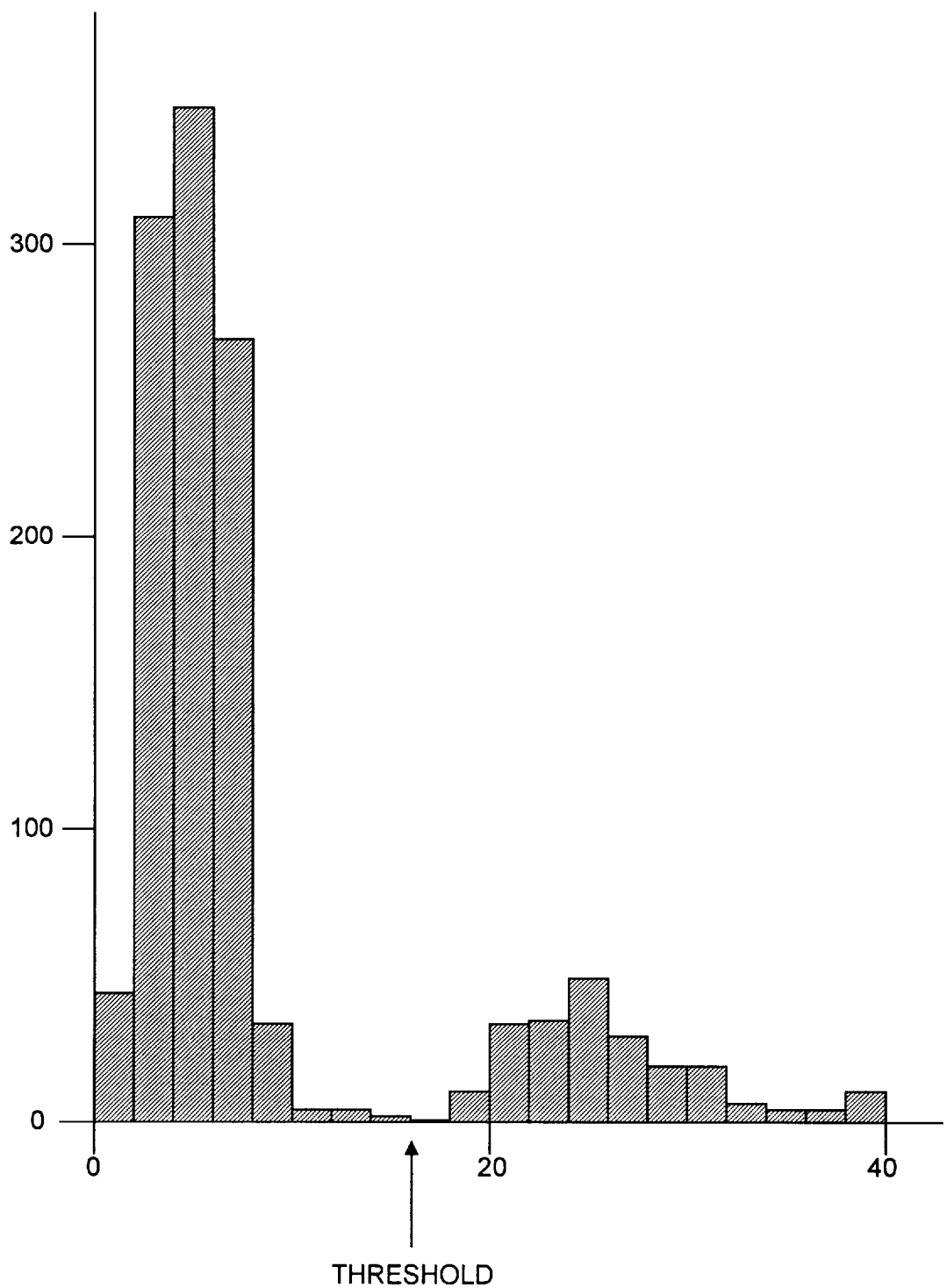
FIG. 5 is a graphical representation of a histogram of intercharacter spacing.

Once the bounding boxes are determined, their position on the image is noted and stored as box locations 116. Histogram generator 106 reads these box locations and calculates interbox spacing. If the distribution of interbox spacing is measured and a histogram is crested, two peaks should occur. An example of this is shown in histogram 118A of FIG. 2 which is represented in FIG. 5 graphically. This is a graph of pixel spacings between successive character bounding boxes for the text area shown in FIG. 4(*a*). Histogram 118A has two peaks, one for a spacing of around 5 pixels and one for a spacing of around 25 pixels. A minimum occurs between the two peaks, at around 16 pixels. Thus, for this data, a space of less than 16 pixels is probably an intraword space and a space of more than 16 pixels is probably an interword space.

Labeller 108A uses that threshold to label each interbox space as either interword or intraword. Strictly speaking, labels are associated with the spaces between bounding boxes not the bounding boxes themselves. However, except for the last bounding box on each line of text, there is a one-to-one correspondence between bounding boxes and spaces, so the labels could just as easily be associated with the bounding boxes. In the latter case, if the label for a space is associated with the bounding box at the left of the space, then each bounding box might be characterized as bounding either a word-ending character or a non-word-ending character. Either way, the essential pattern of labels is the same. For example, if the text being processed is:

"A sample sentence appears here."

the pattern of spaces might be:

"S-----S-------S------S---S"

where '-' indicates an intraword space and 'S' indicates an interword space. Note that the '.' at the end of the sentence did not qualify for a bounding box and is therefore not considered, and an interword space following the end of each line is assumed. If instead, the labels '-' and 'S' were affixed to non-word-ending characters and word-ending characters, respectively, the same pattern would emerge.

If expressed in binary, where '0' replaces '-' and '1' replaces 'S', the pattern would be:

"1000001000000010000001000".

This binary pattern could be compressed with run-length encoding to "16874" which is just the pattern of word lengths.

The above example assumed that the bounding box locations were such that no intraword space was greater than the threshold and no interword space was less than the threshold. If there were, the pattern might be different, but it would be the same pattern both when the text was input and when the text was used for querying.

In some embodiments, it might be desirable to fix the threshold ahead of time. If the threshold is fixed ahead of time, at say 16 pixels, then the histogram does not need to be created, as each space can be labelled as it is measured. It is not always desirable to fix the threshold, however. If the target document can be submitted with different scales or scanned at different resolutions, then the number of pixels at the minimum of the distribution of interbox spacing will vary and should be calculated each time for the particular image being used.

Once word patterns 120 are generated by labeller 108A, they are formed into descriptors 122 by descriptor writer 110A. In one specific embodiment, a descriptor is the hashed concatenation of a set number of word lengths. These descriptors are then used as taught in the above description of FIG. 1.

FIG. 3 is a block diagram of a descriptor generator 40B which is similar to descriptor generator 40A, except that descriptor generator 40B generates descriptors based on pixel density rather than interbox spacing. As with descriptor generator 40A, descriptor generator 40B includes a segmenter 102, a bounding box identifier 104, and the descriptor generator processes an input file 112 and generates segmented image 114 and box locations 116. Descriptor generator 40A also includes several elements which perform functions analogous to elements in descriptor generator 40B: a histogram generator 106B which generates a histogram 118B, a labeller 108B which generates density patterns instead of word patterns, and a descriptor writer 110B which writes descriptors based on density patterns rather than word patterns.

Descriptor generator 40B also contains elements which have no analogy in descriptor generator 40A: a refiner 124 for refining box locations (optional), a pixel density counter 126 coupled to receive segmented image 114 and coupled to either refiner 124 (if used) or to receive box locations 116, and storage for pixel densities 128. In descriptor generator 40B labeller 108B is coupled to receive box locations 116, pixel densities 128 and histogram 118B. As with descriptor generator 40A, if a fixed threshold is used, histogram 118B is not needed. However, in contrast with descriptor generator 40A, the operation of descriptor generator 40B might be independent of the scales and scanning resolutions used, since the threshold is a pixel density not a spacing.

Figure 6:
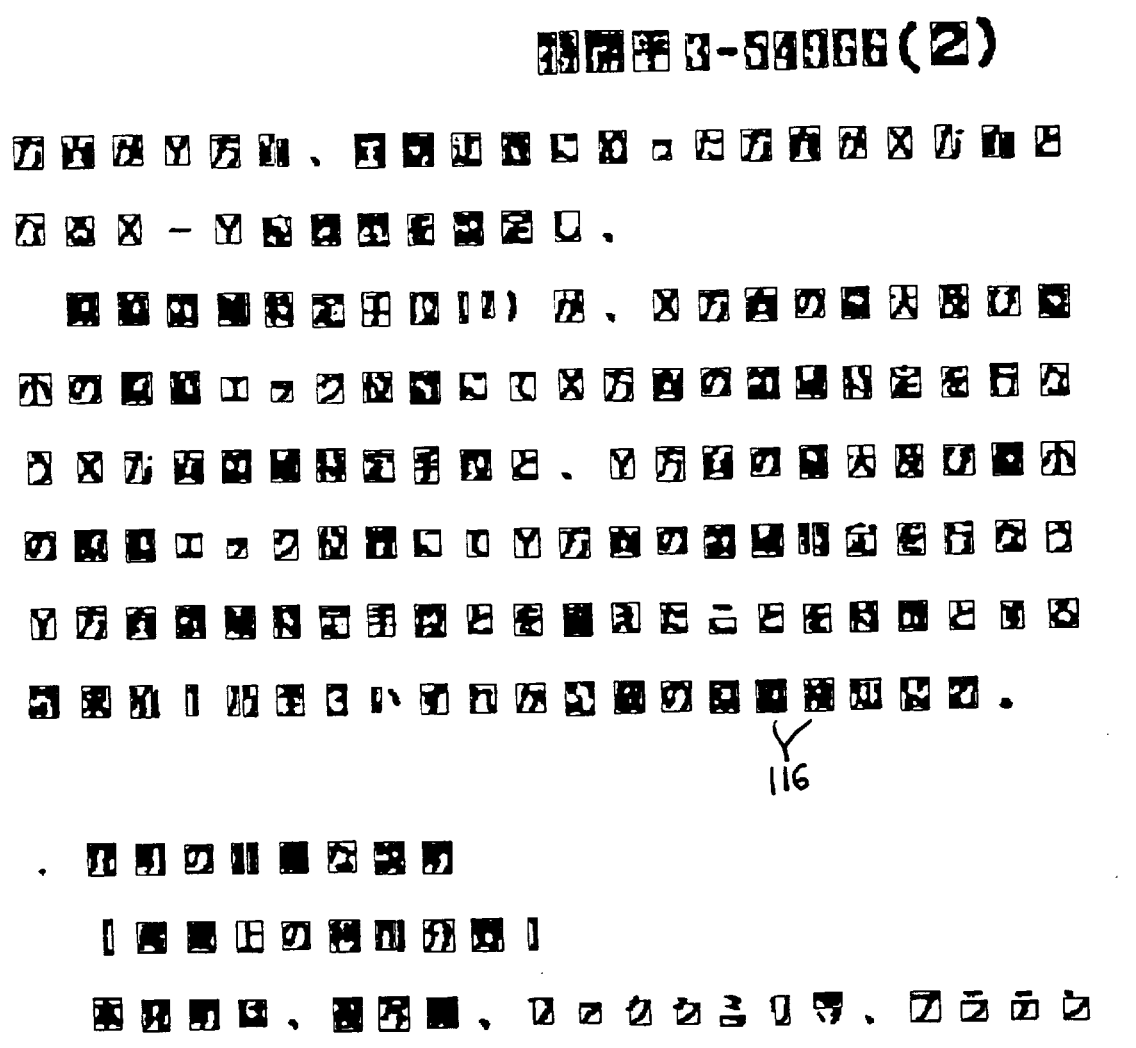

In operation, segmenter 102 reads the input file 112 and segments it into text and other areas. The segmented image 114 is read by box identifier 104 to generate a list of box locations 116. An example of an image which might be contained in input file 112 or segmented image 114 is shown in FIG. 6 with the bounding boxes added as indicated by box locations 116. Although FIG. 6 shows an image of Japanese characters, non-Japanese text with characters having a variable pixel density can also be processed by this apparatus. With Japanese characters, the distribution of pixel densities should have two peaks, one representing Japanese Kanji characters and the other representing Japanese Kana characters. The Kanji characters were originally derived from the Chinese ideograms and tend to have more strokes, while the Kana characters, which are from a syllabic alphabet, have fewer strokes.

Figure 7A:
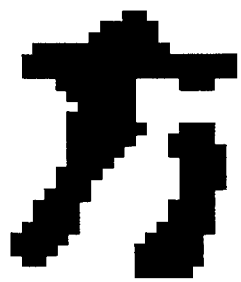
FIG. 7($a$) is an image of a Japanese character.
Figure 7B:
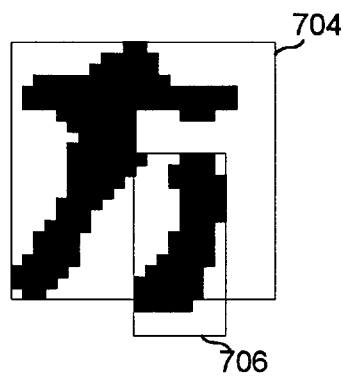
Figure 7C:
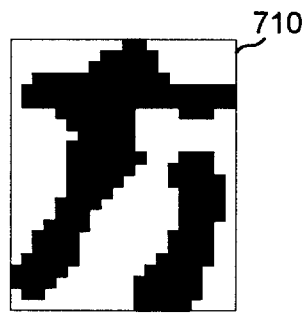

Unlike the 26-letter Latin alphabet, Japanese characters are often made up of unconnected strokes, and a single character might be boxed by multiple bounding boxes. For example, FIG. 7 shows one Japanese character being bounded. FIG. 7(*a*) shows the character before the bounding boxes are generated and FIG. 7(*b*) shows two bounding boxes 704, 706 overlaid on three unconnected elements of the character. Stroke which do not have enough pixels to qualify as their own elements are not bounded.

The optional refiner 124 refines the bounding box process by joining overlapping bounding boxes on the assumption that they cover elements of the same character. Refiner 124 locates a rectangle which encloses all of the overlapping boxes. Thus, as shown in FIG. 7(*c*), the bounding box 710 would result and would replace boxes 704 and 706.

Whether or not refiner 124 is used, pixel density counter 126 counts the number of pixels in each bounding box and the number of black pixels. As should be apparent, the same effect can be had by counting the white pixels, and if the characters are not black, the count is of the number of pixels making up the character, whatever color or colors it might be. The pixel density is then just the number of black pixels divided by the total number of pixels in the bounding box (normalized density). Alternatively, the bounding boxes can be assumed to all be the same size, or can be forced to be the same size, thus eliminating the need for the normalization step. The pixel densities are stored in storage for pixel densities 128 and used by histogram generator 106B to generate histogram 118B.

Figure 8:
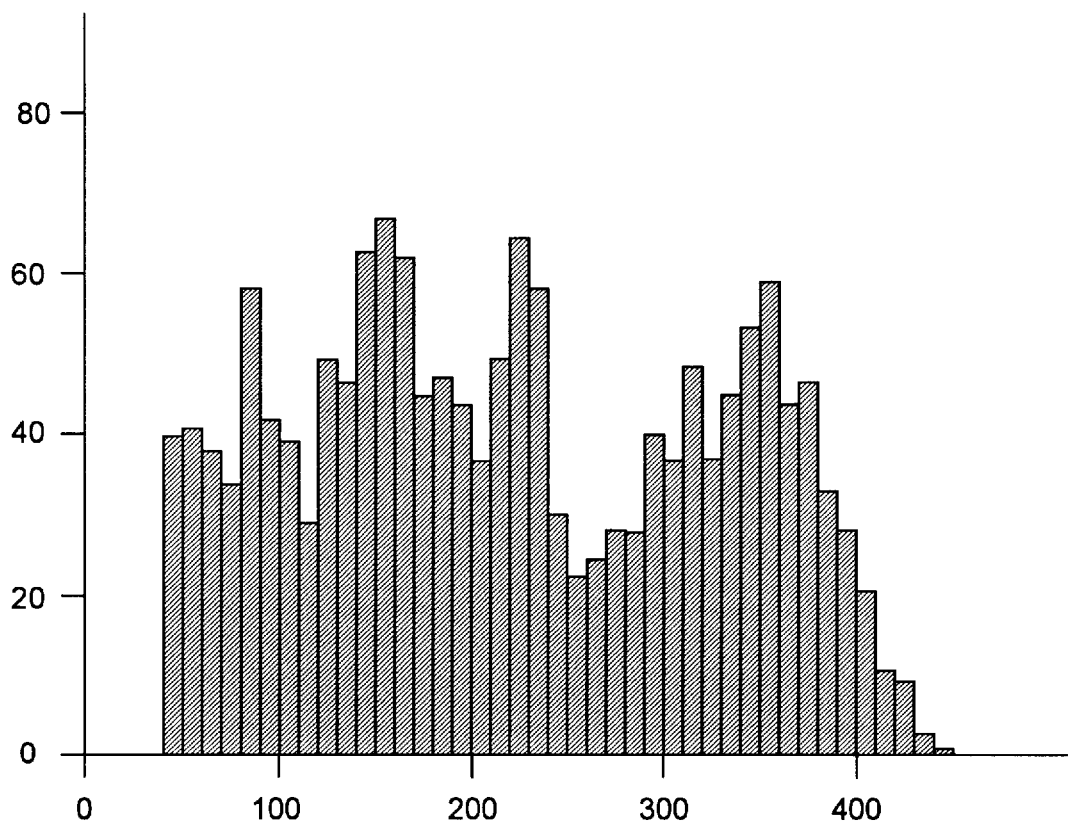
FIG. 8 is a graphical representation of a histogram of pixel densities.

A graphical representation of an example histogram 118B is shown in FIG. 8. In FIG. 8, the histogram shows the distribution of pixels without normalization. The denser Kanji characters are clustered together in the range of 250 to 450 black pixels, and a threshold of 252 pixels separates the peaks well. It should be noted that some Kanji characters may fall below the threshold and some Kana characters may fall above it. However, so long as the measurement is consistent, a document will have the same descriptors when input as when used as a target document.

The threshold can be calculated either by histogram generator 106B or labeller 108B. One way to calculate a threshold is shown by N. Otsu, "A Threshold Selection Method from Gray Level Histograms," *IEEE Trans. Systems man and Cybernetics,* Vol. smc-9, #1, January, 1979, pp. 63–66. In either case, labeller 108B uses the threshold while reading pixel densities 128 (and box locations 116, if needed for normalization) to assign one of two labels to the character. The two labels might be Kanji/Kana, high/low density (more accurate), or just '1'/'0'. In any case, the labels assigned to consecutive bounding boxes form patterns which are stored as density patterns 130. Density patterns 130 are used by descriptor writer 110B to generate descriptors 122 much the same way word patterns are used in descriptor generator 40A (see FIG. 2).

Figure 9:
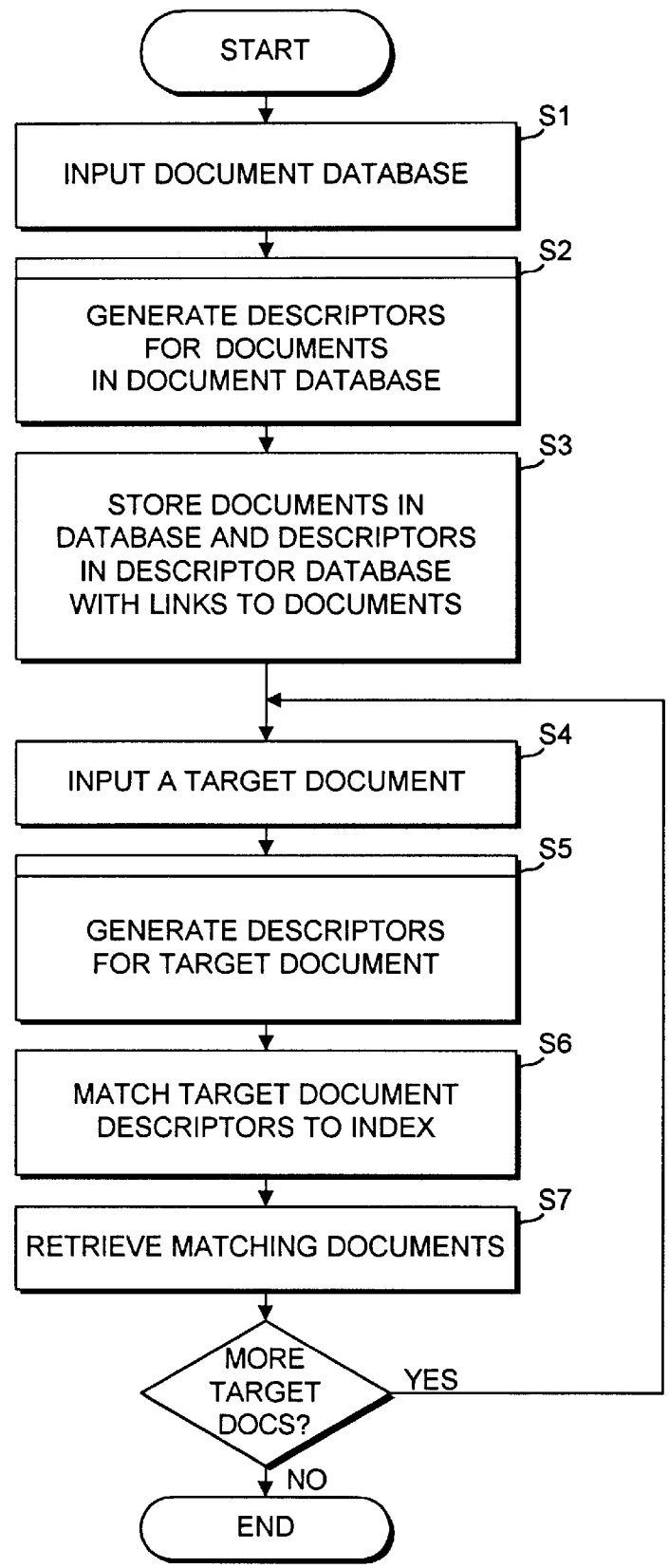
FIG. 9 is a flow chart of a process of storing documents in a document database and retrieving documents by example.
Figure 10:
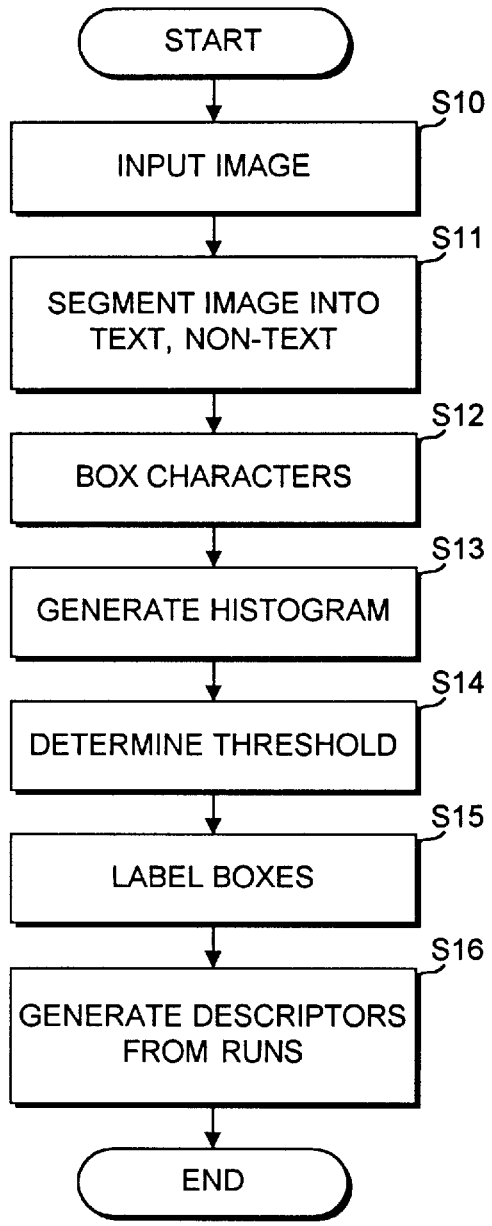
FIG. 10 a flow chart of a process of generating descriptors for a document.

Various apparatus for storing and retrieving documents by example have been described. FIGS. 9–10 are flow charts of a process for document retrieval by example, such as might be performed using the above-described apparatus.

FIG. 9 is a flow chart describing a process of storing documents in a document database and retrieving documents matching a target document by the example provided by the target document.

At step S1, documents are input into a document storage and retrieval system. At step S2, descriptors are generated for the documents being input. Where text is used as the basis for descriptors, the word spacing determines the descriptors. With speech (see FIGS. 11–12), the patterns of phonemes, the patterns of word lengths, or both are used, where the word lengths are determined using speech recognition to first convert the speech to text.

In step S3, following the generation of the descriptors and the input of the documents, the documents are stored in a database and the descriptors are stored in a descriptor database with links to the documents stored in the document database.

The next step (S4), is the beginning of a loop which is executed for each target document to be retrieved. In step S4, the target document is input. As explained above, the input need not be the entire target document nor even an entire page of the target document. Next, in step S5, descriptors are generated for the input target document. This step is similar to step S2. Again, if the input document is speech, the descriptors can be based on phoneme patterns as well as word lengths. Next, in step S6, the descriptors generated from the target document are used as indexes into the descriptor database, which yields a list of potentially matching documents. In step S7, the matching documents are retrieved from the document database.

If more target documents are to be retrieved, the process continues at step S4, otherwise the process completes.

FIG. 10 is a detailed flow chart describing the process of generating descriptors from a document where the document is text or text/graphics. This description applies to input documents whether they are documents initially input to the document database or are portions of target documents. At step S10, the image of the document for which descriptors are to be generated is input to a descriptor generator. The input image is then segmented into text and non-text regions (S 1 ). The descriptor generator analyzes the text segments to find bounding boxes for the characters in text regions (S12).

Once the bounding boxes are identified, the descriptor generator generates a histogram of interbox spacings (S13). From this histogram, the descriptor generator determines a threshold between two peaks of the histogram (S14). The descriptor generator then reviews the text region, or at least the pattern of interbox spacing, to label each interbox spacing based on whether it is less than or greater than the threshold determined in step S14 (S15). The descriptor generator then generates descriptors from runs of interbox spacing (S16).

The flow chart of FIG. 10 also applies to the process of generating descriptors from pixel density patterns. The difference is that in step S13, the histogram generated is a histogram of pixel densities. Once the histogram is generated, the processes of steps S14, S15 and S16 are performed in the same manner as the above example where the histogram is the histogram of interbox spacing.

Figure 11:
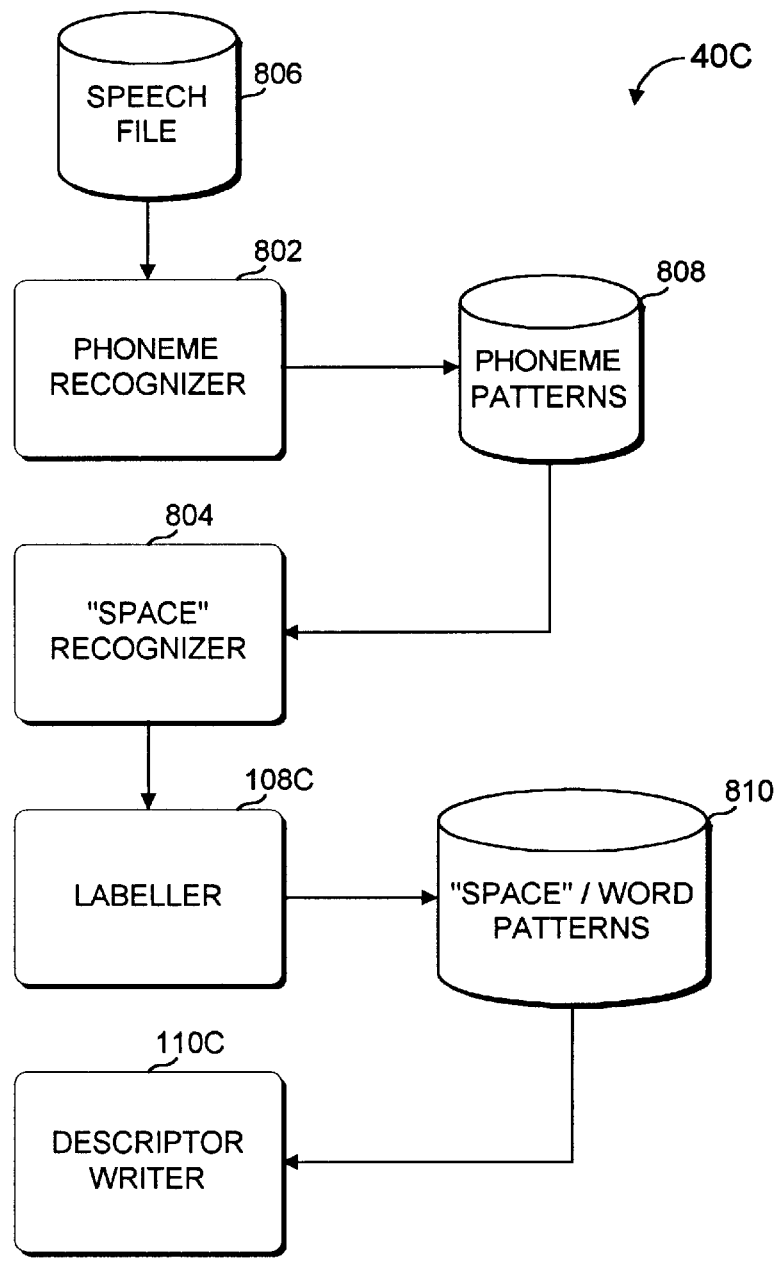
FIG. 11 is a block diagram of an alternate embodiment of a descriptor generator wherein the input documents are speech and the descriptors are based on the number of phonemes per word.
Figure 12:
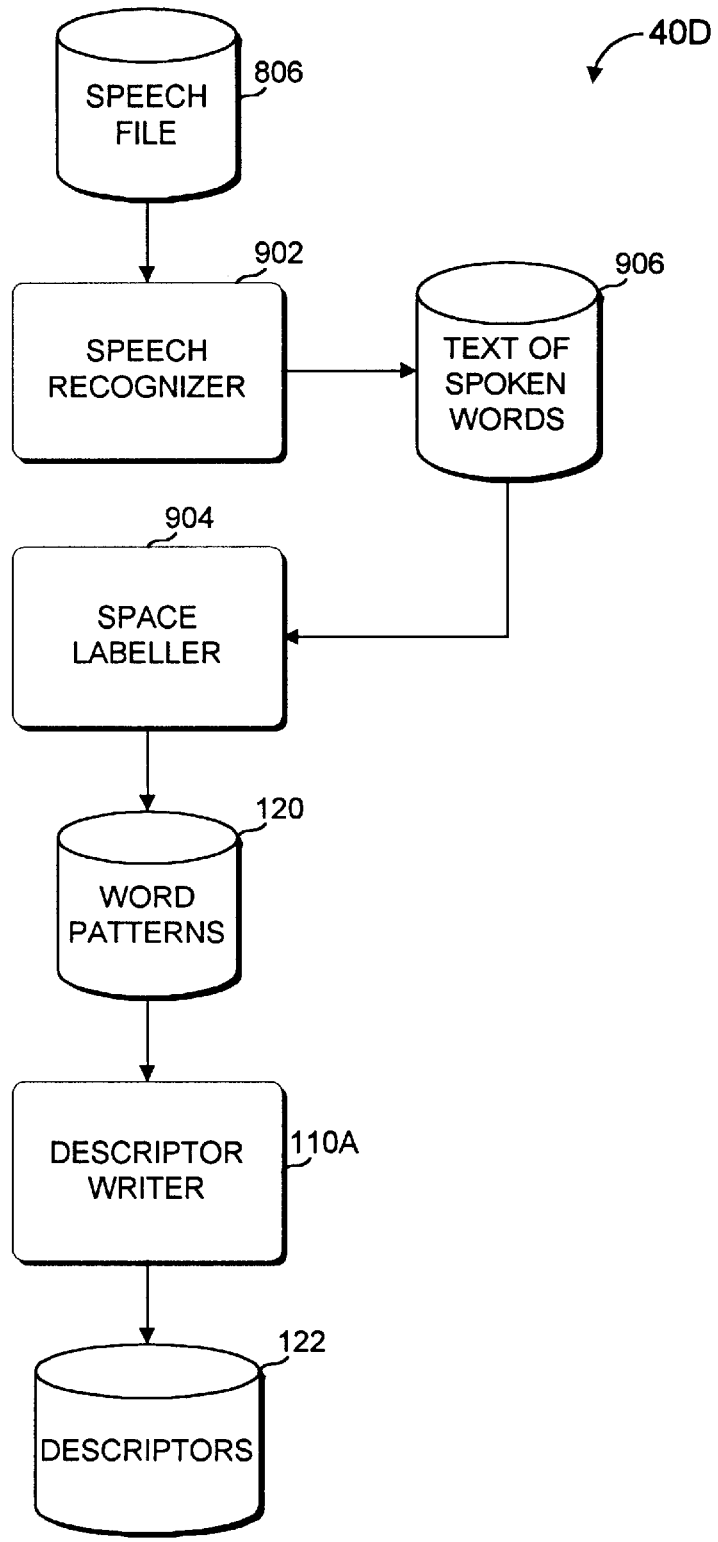
FIG. 12 is a block diagram of an alternate embodiment of a descriptor generator wherein the input documents are speech and the descriptors are based on the number of letters per word.

FIGS. 11–12 are block diagrams of descriptor generators for generating descriptors from speech documents. These speech documents can be either reference documents or target documents. Examples of speech documents are digitized audio of famous speeches, lectures, doctor's comments on patients, pronunciations and the like, however any speech can be used.

FIG. 11 is a block diagram of a descriptor generator 40C, where the descriptors are based on phonemes. Descriptor generator 40C includes a phoneme recognizer 802, a "space" recognizer", a labeller 108C and a descriptor writer 110C. Phoneme recognizer 802 reads an input speech document 806 and generates phoneme patterns 808. The phoneme patterns 808 represent the speech, indicating which sounds were emitted and where silences occur. These phoneme patterns 808 are fed to "space" recognizer 804, which isolates the positions of the silence "phonemes" in the recognized speech and passes them to labeller 108C. Labeller 108C and descriptor writer 110C operate like their counterparts in descriptor generators 40A, 40B.

The output of labeller 108C is the patterns of "spaces" and words. For example, if speech file 806 contained the spoken phrase "the large car", phoneme recognizer 802 might recognize the phrase as being eleven phonemes and identify the particular eleven phonemes. "Space" recognizer 804 would then identify that the phonemes were two spoken phonemes, a silence phoneme, four spoken phonemes, a silence phoneme, and three spoken phonemes. Labeller 108C would then label the silence phonemes as "spaces", resulting in the pattern 2-S-4-S-3, which descriptor writer 110C would write out as "2-4-3".

Even where all the reference documents are speech and the only descriptors are phoneme-based descriptors, a text document could still be used as a target document. The text of the target document is fed through a phoneme generator which generates phonemes from text, and the phonemes would be used to generate descriptors. Of course, with a complex language such as English, an automatic phoneme generator will make errors. However, since the descriptors are redundant, the correct document will generally be found even in the presence of errors. Were both the input document and the reference documents are speech and are described by phoneme patterns, the errors are even less significant if the same phoneme generator is used for both the reference documents and the input documents, since an error common to both does not make a document harder to find. The same is true for text reference documents and speech input documents, or some combination of each. Since phonemes are the unit of speech, the embodiment shown in FIG. 11 is not specific to a particular language.

FIG. 12 is a block diagram of a descriptor generator 40D, where the descriptors are based on word length, but are generated for speech documents. Descriptor generator 40D is shown comprising a speech recognizer 902 which also reads a speech document/file 806 as with descriptor generator 40C, but instead of outputting phonemes, speech recognizer 902 outputs the text 906 of the spoken words. Text 906 is processed by space labeller 904, which marks the locations of the spaces in text 906, resulting in word patterns 120, as are described above in connection with FIG. 2. As also described in connection with FIG. 2, word patterns 120 are used by descriptor writer 110A to generate descriptors 122.

Continuing the example used in connection with FIG. 11, if speech file 806 contained the spoken phrase "the large car", speech recognizer 802 might recognize the phrase as being the text: "the large car", and space labeller 904 would output the word pattern "---S-----S---" which would result in the descriptor "3-5-3".

Figure 13:
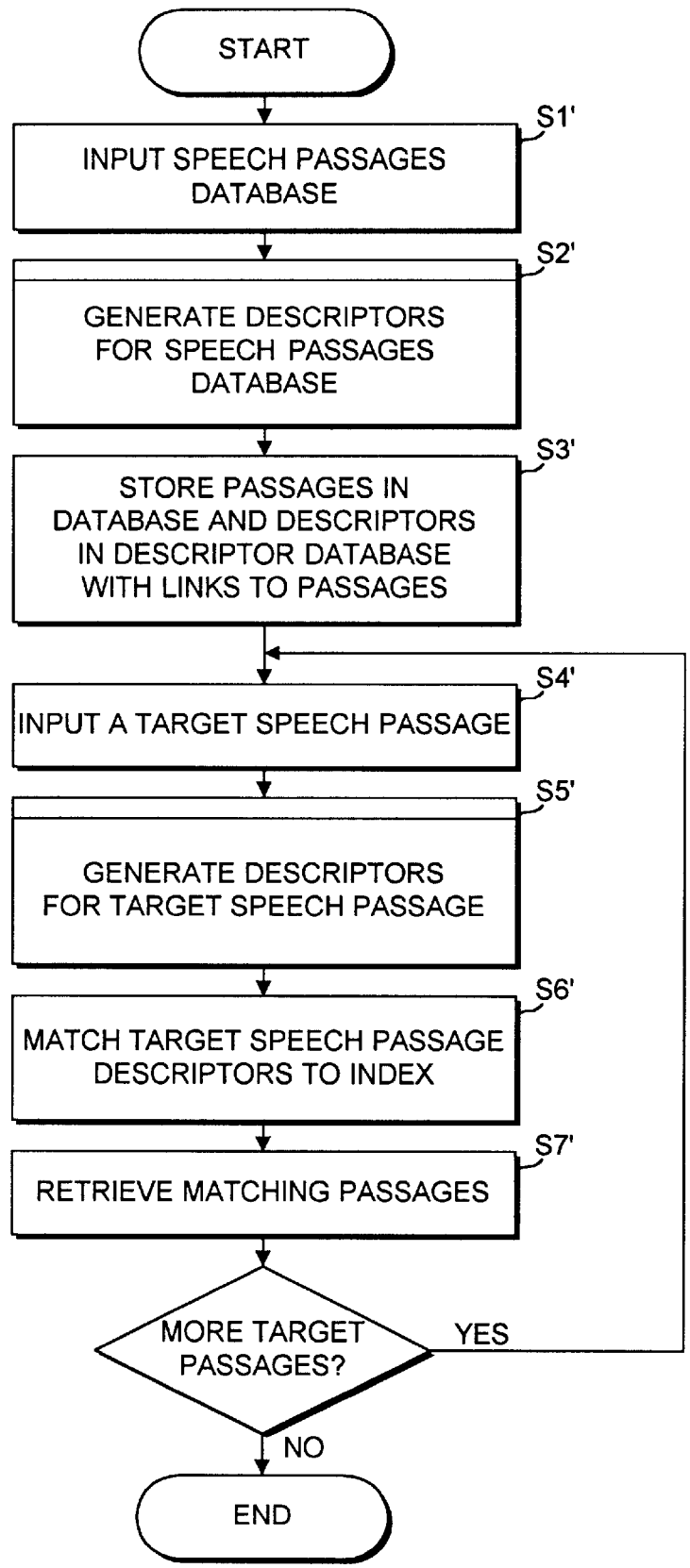
FIG. 13 is a flow chart of a process of storing reference speech passages and retrieving speech passages by example using target speech passages.
Figure 14:
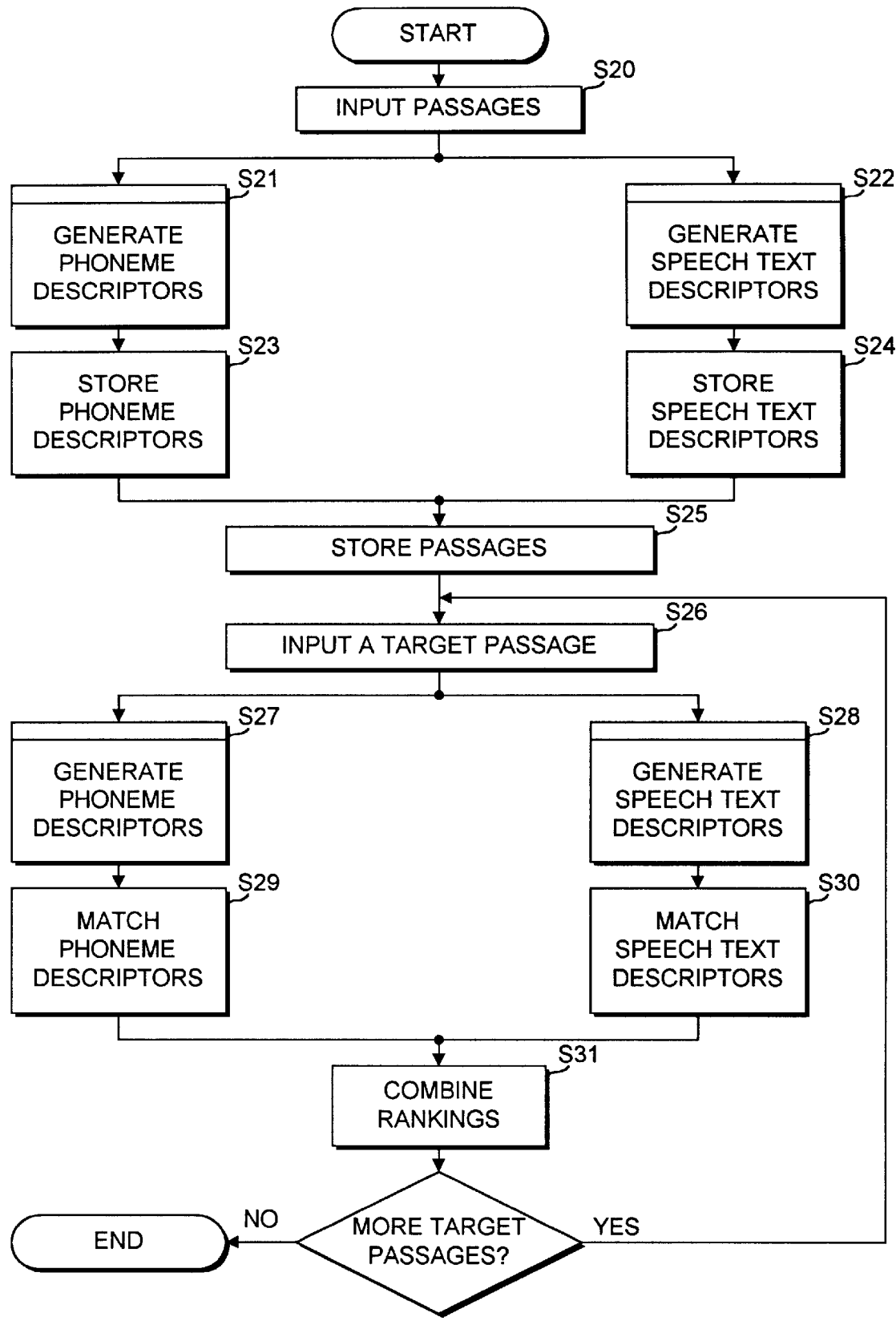
FIG. 14 is a flow chart of a process of retrieving speech passages by example using both phoneme recognition and speech text recognition.

FIGS. 13–14 are flow charts illustrating a process of matching speech documents (passages). The process shown in FIG. 13 is similar to the process shown in FIG. 9, except that the process of FIG. 9 covers all combinations of speech and text input and target documents, whereas the processes of FIGS. 13 and 14 deal only with speech passages. Of course, text passages could be converted to "quasi-speech" in the form of phoneme patterns so that documents might be matched on the basis of "sound-alike" matching, but since only the number of phonemes per word is used in descriptor generation, "sound-alike" matching is not needed. In fact, all that is needed is a dictionary of words which includes the number of phonemes for each word, thus serving as a simple look up table.

In the process shown in FIG. 13, speech passages are input (S1'), descriptors are generated for them (S2') and the passages and descriptors are stored with links between them (S3'). To retrieve a passage by matching, the target passage is input (S4'), descriptors are generated (S5'), the descriptors are matched (S6') to descriptors in the databases created in step S3', and the matching passages are retrieved (S7'). If more target passages exist, steps S4' through S7' are repeated for those passages.

The process shown in FIG. 14 uses both phoneme descriptors and speech text descriptors. The speech text descriptors are essentially the same as the word length descriptors described above—they are generated from the text resulting from speech recognition of the passages. The reference passages are input (S20) and phoneme descriptors are generated (S21) along with text descriptors (S22). These steps can be performed in parallel, but need not be. Next, the phoneme descriptors are stored (S23) and the text descriptors are stored (S24) and the passages are stored (S25) with links between passages and descriptors.

To retrieve a passage, the target passage is input (S26), and phoneme descriptors are generated (S27) and text descriptors are generated (S28). Again, these steps can occur in series or parallel. Next, the phoneme descriptors are matched to the stored phoneme descriptors (S29) and the text descriptors are matched to the stored text descriptors (S30) to provide two lists of passages ranked according to how well they matched. The two lists are then merged into a single ranging (S31). It is well known in the art of pattern matching to combine independently generated rankings. See, for example, T. K. Ho, J. J. Hull, S. N. Srihari, "Decision Combination in Multiple Classification Systems", *IEEE Transactions on Pattern Analysis and Machine Intelligence,* V.16, No. 1, January 1994, pp. 66–75.

The above description is illustrative and not restrictive. Many variations of the invention will become apparent to those of skill in the art upon review of this disclosure. Merely by way of example, if the distribution of a metric related to characters has more than two peaks, the distribution might be divided into more than two ranges and the labeller in that case would label each character with more than just a binary label. Also, the text documents can be stored in a variety of formats, such as ASCII files, page description language files such as Postscript™ files, or word processing files such as WordPerfect™ or Microsoft Word™ files. The scope of the invention should, therefore, be determined not with reference to the above description, but instead should be determined with reference to the appended claims along with their full scope of equivalents.

What is claimed is:

1. A document retrieval apparatus, wherein a target document is input and a matching document is retrieved from a document database, comprising:

character detecting means for detecting character bounds in the target document based on image content of the target document;

discrimination means, coupled to the character detecting means, for discriminating the character bounds into classes, wherein discrimination is done based on at least one unambiguous characteristic of the character bound including the pixel density over an area of the character bound;

descriptor generating means, coupled to receive class indications of character bounds from the character detecting means, for generating target document descriptors based on patterns of class indications;

searching means, coupled to receive the target document descriptors from the descriptor generating means, for searching the document database for potentially matching documents which have descriptors in common with the target document;

evaluation means, coupled to receive a set of potentially matching documents from the searching means, for determining at least one matching document from among the potentially matching documents; and output means, coupled to the evaluation means, for outputting the at least one matching document or indication thereof as a result of a retrieval request wherein the target document is input.

2. The document retrieval apparatus of claim 1, wherein the at least one unambiguous characteristic includes spacing between character bounds.

3. The document retrieval apparatus of claim 1, wherein the characters of the target document are Japanese characters.

4. The document retrieval apparatus of claim 1, wherein the discriminating means discriminates each character bound into one of two classes.

5. The document retrieval apparatus of claim 4, wherein the two classes are the class of character bounds with pixel density less than a threshold and pixel density greater than the threshold.

6. The document retrieval apparatus of claim 1, wherein the target document is input as a paper document.

7. The document retrieval apparatus of claim 1, wherein the target document is input as an electronic image of the target document.

8. A method of using a target document to specify a matching document in a document retrieval system which includes a document database in which the matching document is stored and the matching document is the target document or a document with elements in common with the target document, the method comprising the steps of:

inputting an image of the target document to the document retrieval system;

detecting character bounds in the target document image;

measuring at least one metric for each character bound in a sample of the character bounds, thereby resulting in a distribution of metric values, the at least one metric including a pixel density over an area of the character bound;

dividing the distribution of metric values into a plurality of ranges where each range is associated with one class of character bounds;

labelling each character bound in the sample with an indication of its class based on the metric value for said each character bound;

forming descriptors for the target document based on patterns of class indications;

searching an index of descriptors for documents in the document database using the formed descriptors of the target document;

identifying at least one document in the document database as a matching document when the at least one document has more descriptors in common with the target document than a nonmatching document.

9. The method of claim 8, wherein the plurality of ranges of metric values is two ranges separated by the threshold metric value.

10. An apparatus for matching an input document to a reference document in a document database, comprising:

a document database, wherein reference descriptors are derived from content of reference documents in said document database;

a descriptor database associating reference descriptors and reference documents, wherein a reference descriptor describes, at least in part, a pattern of character densities and a specific reference descriptor and a specific reference document are associated in the descriptor database when the pattern of character densities described by the specific reference descriptor is found in the specific reference document;

input means for inputting content of an input document to be matched against said reference documents of said document database;

descriptor derivation means, coupled to said input means, for deriving at least one input descriptor from the input document where said input descriptor describes, at least in part, a pattern of character densities found in the input document; and output means, coupled to said descriptor derivation means, for outputting an indication of reference documents which are associated with reference descriptors which match the input descriptor.

11. The apparatus of claim 10, wherein the input documents and target documents are formatted as ASCII documents, page description language documents or word processing format documents.

12. A method of using a target document to specify a matching document in a document retrieval system which includes a document database in which the matching document is stored and the matching document is the target document or a document with elements in common with the target document, the method comprising the steps of:

inputting an image of the target document to the document retrieval system;

detecting character features in the target document image according to a plurality of classes of character features, wherein at least one of the character features detected is a pixel density over an area of a character bound;

forming descriptors for the target document based on the detected character features of each of the plurality of classes of character features;

for each class of character features, searching an index of descriptors for documents in the document database using the formed descriptors of the target document for said each class; and identifying at least one document in the document database as a matching document when the at least one document has more descriptors in common with the target document than a nonmatching document.

13. The method of claim 12, wherein the plurality of classes of character features includes an intercharacter spacing class of features describing patterns of word lengths and a character pixel density class of features describing at least a binary pattern of character density being greater than or less than a threshold density.

14. A method of using a target document to specify a matching document in a document retrieval system which includes a document database in which the matching document is stored and the matching document is the target document or a document with elements in common with the target document, the method comprising the steps of:

inputting an image of the target document to the document retrieval system;

detecting character features in the target document image according to a plurality of classes of character features;

forming descriptors for the target document based on the detected character features of each of the plurality of classes of character features;

for each class of character features, searching an index of descriptors for documents in the document database using the formed descriptors of the target document for said each class; and identifying at least one document in the document database as a matching document when the at least one document has more descriptors in common with the target document than a nonmatching document wherein the plurality of classes of character features includes a word length class of features describing patterns of word lengths and a phoneme word length class of features describing patterns of the number of phonemes per word.

15. A method of using a target document to specify a matching document in a document retrieval system which includes a document database in which the matching document is stored and the matching document is the target document or a document with elements in common with the target document, the method comprising the steps of:

inputting an image of the target document to the document retrieval system;

detecting character features in the target document image according to a plurality of classes of character features;

forming descriptors for the target document based on the detected character features of each of the plurality of classes of character features;

for each class of character features, searching an index of descriptors for documents in the document database using the formed descriptors of the target document for said each class; and identifying at least one document in the document database as a matching document when the at least one document has more descriptors in common with the target document than a nonmatching document wherein the plurality of classes of character features includes an intercharacter spacing class of features describing patterns of word lengths, a character pixel density class of features describing a pattern of at least character densities compared with a threshold, and a phoneme spacing class of features describing the number of phonemes per word.

16. A method of using a target document to specify a matching document in a document retrieval system which includes a document database in which the matching document is stored and the matching document is the target document or a document with elements in common with the target document, the method comprising the steps of:

inputting an image of the target document to the document retrieval system;

detecting phoneme features in the target document image according to a plurality of classes of phoneme features;

forming descriptors for the target document based on the detected phoneme features of each of the plurality of classes of phoneme features;

for each class of phoneme features, searching an index of descriptors for documents in the document database using the formed descriptors of the target document for said each class;

identifying at least one document in the document database as a matching document when the at least one document has more descriptors in common with the target document than a nonmatching document.

17. The method of claim 16, wherein the phoneme features describe patterns of the number of phonemes per word.

* * * * *